Aug. 23, 1966     C. J. RICHER ETAL     3,267,561

METHOD OF FORMING AN AXIAL SEAL PLATE

Filed Jan. 3, 1963

INVENTOR.
Chester J. Richer
BY Harold R. Rahr

Wayne Lang
AGENT 3,267,561
METHOD OF FORMING AN AXIAL SEAL PLATE
Chester J. Richer, Wellsville, and Harold R. Rahr, Belmont, N.Y., assignors, by mesne assignments, to The Air Preheater Company, Inc., a corporation of Delaware
Filed Jan. 3, 1963, Ser. No. 249,226
4 Claims. (Cl. 29—157)

The present invention relates to a method of forming a structurally strong curvilinear plate, and particularly to a method by which such a plate may be accurately and economically formed, then combined with a structurally rigid backing of predetermined strength.

In rotary regenerative heat exchange apparatus of the type having a cylindrical rotor carrying a mass of heat absorbent material alternately between a heating fluid and a fluid to be heated that are directed to and form a surrounding housing, the space between the rotor and its surrounding housing being provided with sealing means to preclude the flow of fluid therethrough. The sealing means may variously assume the form of sealing leaves on the end edges of the rotor that contact confronting housing structure, or they may comprise sealing members held axially between the rotor and rotor housing to preclude the flow of fluid therebetween. This invention is directed to a method of forming a specific curvilinear axial sealing plate.

The formation of a structurally strong plate member curved to a high degree of accuracy usually requires extensive machine work that is both time consuming and expensive, and moreover results in an end product that is excessively heavy and of generally imperfect configuration.

The principal object of this invention therefore is to provide a method for manufacturing a curvilinear plate of substantial size that is structurally strong, relatively light in weight and is highly accurate but is efficiently produced at a reasonable cost by the expedient of eliminating, to a large degree, the usually required machining operations.

A more comprehensive understanding of the proposed method of forming a structurally strong sealing plate may be had when viewed in conjunction with the accompanying drawing in which.

As the first step in the fabrication of the axial sealing plate defined herein, a series of metallic ribs 12 are sheared to the same length and graded widths in such a manner as to provide not more than two of any single width. As few as three ribs may be adequate under certain conditions. However from five to ten ribs are usually required to impart the proper strength and rigidity to a structure of the size most commonly employed.

Figure 1:
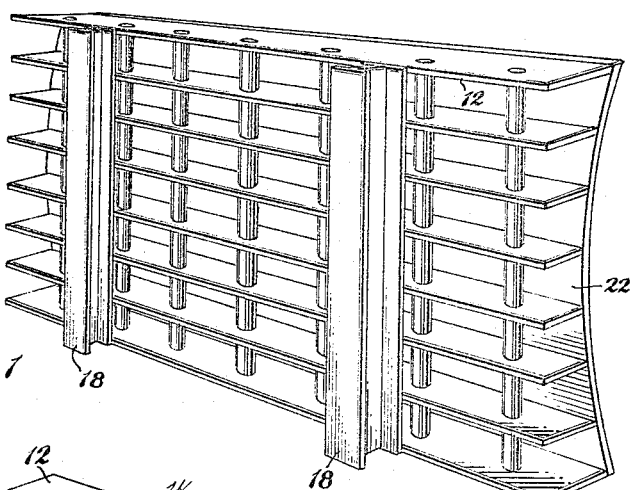
FIGURE 1 is a perspective view of a completed curvilinear sealing plate.
Figure 2:
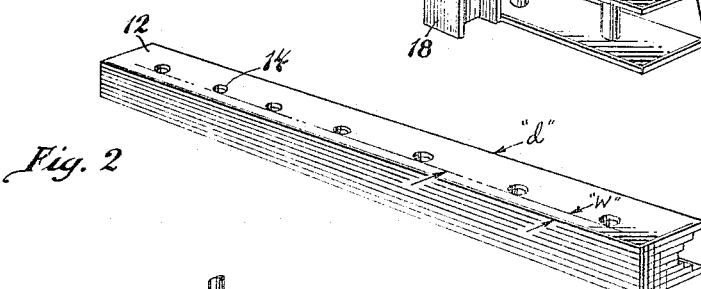
FIGURE 2 is a diagrammatic showing of the basic rib arrangement preparatory to assembly.

The sheared ribs are then arranged in a symmetrical stack wherein the widest ribs are at the top and bottom of the stack and the progressively more narrow ribs are positioned at the center thereof in the manner illustrated in FIGURE 2. The ends and one lateral side of the stacked ribs are placed in alignment so that holes 14 drilled laterally therethrough will produce equal size web portions $w$ on one side therof, and variously sized web portions $d$ the opposite side thereof.

Figure 3:
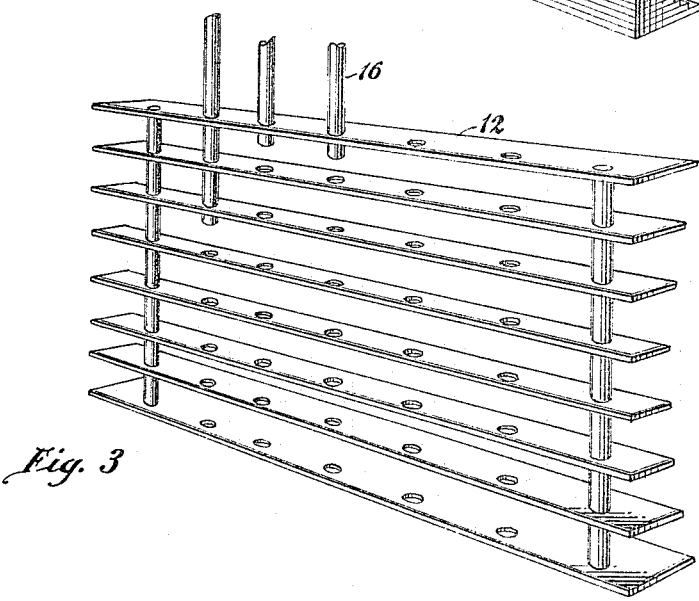
FIGURE 3 is a diagrammatic view during assembly showing the spacing of the ribs and the insertion of the tubular support members.

A series of longitudinally spaced holes 14 are thus drilled through the stacked ribs to provide holes in each rib, identically spaced except for the varying web portion $w$ at one side thereof. A number of tubular support members 16 corresponding to said series of longitudinally spaced holes are cut and inserted through the aligned openings in said ribs. The outside diameter of the tubular support members is only slightly less than the diameter of the holes in said ribs to permit the ribs to be moved apart on the tubular support members into parallel planes so as to provide in effect a grid assembly having apertured ribs extending normal to the spaced tubular support members in the manner shown by FIGURE 3.

The grid assembly is aligned for squareness and then tack welded together. Final welds are subsequently added to the assembly after again checking for squareness of the grid and perpendicularity of the spaced ribs.

A plurality of I type beams 18 are fitted and welded transverse to the ribs on the side thereof adjacent the equal sized rib portions so as to provide additional strength and rigidity to the grid assembly during its construction and again later when exposed to the great differential of pressure commonly found in heat exchange apparatus of the type defined.

After the transverse beams have been fitted and welded to the grid assembly, the entire assembly may be transferred as a unit to a planer where each of the variously sized web portions of the ribs lying opposite the transverse beams are machined longitudinally to a predetermined width $d$ that positions their longitudinal edges axially along the periphery of a broken arcuate surface.

A steel plate 22 having a surface area similar to that of the broken arcuate surface formed by the longitudinal ribs is rolled in a curvilinear form having a radius of curvature somewhat less than that of the broken arcuate surface. The curvilinear plate is then placed coaxially on the ribs of the grid assembly so that the central portion of the curved plate abuts the central pair of ribs and is entirely supported thereby. The plate is then welded to the ribs along the line of contact. Alternate sides of the curved plate are then forced by clamping means into contact with adjacent ribs and then welded thereto whereby the plate is combined integrally with each rib of the grid assembly. As the curvilinear plate is secured to the ribs of the grid assembly it is continuously flattened out until its radius of curvature compares with that of the broken arcuate surface formed by the longitudinal edges of the ribs.

While this invention has been described with reference to a specific embodiment illustrated in the drawing, it is evident that numerous changes may be made without departing from the spirit of the invention, and it is intended that all matter contained in the above description or shown in the accompanying drawings shall be interpreted as illustrative and not in a limiting sense.

We claim:
1. The method of providing a stucturally reinforced curvilinear plate which comprises the steps of cutting a series of equi-length ribs to graded widths, arranging said ribs in a laterally abutting stack with the ends and one side of said ribs in alignment and having progressively wider ribs at the top and bottom of said stack, drilling a plurality of longitudinally spaced openings in said stacked ribs equally spaced from the aligned sides thereof to provide web portions of equal size at one side of the openings and web portions of various sizes at the opposite side thereof, inserting tubular support members through said openings in aligned ribs, separating the ribs apart in parallel planes on said support members and securing them thereto, machining the variously sized web portions of said ribs sufficient to place each longitudinal edge thereof on the periphery of a cylindrical segment having a predetermined radius, forming a curved metallic plate to fit within the cylindrical segment formed by said ribs, and bonding the plate to said ribs to provide an integral structure therewith.

2. The method of providing a structurally reinforced curvilinear plate which comprises the steps of cutting a series of equi-length ribs to graded widths, arranging said ribs in a laterally abutting stack with the ends and one side of said ribs in alignment and having progressively wider ribs at the top and bottom of said stack, drilling a plurality of longitudinally spaced openings in said ribs equally spaced from the aligned sides to provide web portions of equal sizes at one side thereof and web portions of various sizes at the opposite side thereof, inserting tubular support members through aligned openings in said ribs, separating the ribs apart in parallel planes on said tubular support members and securing them thereto, machining the various sized rib portion of each rib along its longitudinal edge to position it on the periphery of a broken cylindrical segment having a predetermined radius, forming a metallic plate to fit within the curvature of the broken cylindrical segment formed by said ribs, and bonding the plate to said ribs to provide an integral structure therewith.

3. The method of forming a reinforced sealing plate which comprises the steps of cutting a series of equi-length ribs to graded widths, arranging said ribs in a laterally abutting stack with the ends and one side of said ribs in alignment and arranged with progressively wider ribs at the spaced top and bottom of said stack, drilling a plurality of longitudinally spaced openings in said ribs equally spaced from the aligned sides thereof to provide web portions of equal sizes at one side of the openings and web portions of various sizes at the opposite side thereof, inserting tubular support members through aligned openings of said ribs, separating said ribs apart in parallel planes on said tubular members, connecting the ribs securely to the tubular members, machining each variously sized web along its longitudinal edge to position it axially on the periphery of a cylindrical segment having a predetermined radius of curvature, curving a metallic plate to a smaller radius than that of the cylindrical segment formed by the longitudinal edges of said ribs, and bonding the plate to said ribs to provide a structure integral therewith.

4. The method of forming a reinforced sealing plate which comprises the steps of cutting a series of equi-length ribs to graded widths, arranging said ribs in lateral abutment to provide a stack having the ends and one side of said ribs in alignment and progressively wider ribs lying at the top and bottom of said stack, drilling a plurality of longitudinally spaced openings in said ribs equally spaced from the aligned sides of said ribs to provide equal sized web portions at one side of said openings and variously sized web portions at the opposite side thereof, inserting tubular support members through aligned openings in said ribs, separating said ribs apart in parallel planes on the tubular members, connecting the ribs securely to the tubular members, machining the longitudinal edge of each variously sized web portion to provide on each rib a line of contact with a segment of a cylindrical surface fitted thereto and bonding a segment of a cylindrical surface to said ribs to provide a curvilinear plate integral therewith.

References Cited by the Examiner
UNITED STATES PATENTS

| | | | |
|---|---|---|---|
| 2,780,176 | 2/1957 | Holzwarth | 29—445 XR |
| 3,089,226 | 5/1963 | Szots et al. | 29—433 XR |
| 3,123,907 | 4/1964 | Thomas | 29—481 XR |

CHARLIE T. MOON, *Primary Examiner.*